United States Patent [19]

Fushiya et al.

[11] Patent Number: 4,977,358

[45] Date of Patent: Dec. 11, 1990

[54] SWITCHING CIRCUIT FOR VARYING ROTATIONAL SPEED OF MOTOR

[75] Inventors: Fusao Fushiya; Akiharu Hayashi, both of Anjo; Fumiaki Itsuki, Ibaraki; Kunio Nagata, Otokuni, all of Japan

[73] Assignees: Makita Electric Works, Ltd., Aichi; Omron Corporation, Kyoto, both of Japan

[21] Appl. No.: 513,939

[22] Filed: Apr. 24, 1990

[30] Foreign Application Priority Data

Apr. 26, 1989 [JP] Japan .................................. 1-109283

[51] Int. Cl.$^5$ ............................................. H02P 5/00
[52] U.S. Cl. ..................................... 318/268; 388/804
[58] Field of Search ................... 318/55, 59, 66, 67, 318/139, 134, 257, 268, 270, 271, 434; 388/803, 804, 805, 811, 807, 838, 814, 903, 916; 361/23, 24, 30, 31, 5, 8, 13

[56] References Cited

U.S. PATENT DOCUMENTS

| | | | |
|---|---|---|---|
| 3,249,836 | 5/1966 | Stamm | 318/67 X |
| 3,422,330 | 1/1969 | Swanke | 388/838 |
| 3,564,372 | 2/1971 | Vogelsberg et al. | 388/838 X |
| 3,575,648 | 4/1971 | Ridding | 318/67 X |
| 3,950,683 | 4/1976 | Lamson | 388/807 |
| 4,217,526 | 8/1980 | Farr | 318/139 |
| 4,325,011 | 4/1982 | Peterson | 388/811 |

Primary Examiner—William M. Shoop, Jr.
Assistant Examiner—A. Jonathan Wysocki
Attorney, Agent, or Firm—Dennison, Meserole, Pollack & Scheiner

[57] ABSTRACT

A switching circuit for varying rotational speed of a motor includes a power supply line for connecting the motor to a power source so as to supply driving power to the motor. A parallel connecting circuit of an on-off switch and a short circuiting switch is provided in the power supply line, in such a manner that the driving power is continuously supplied to the motor when the short circuiting switch is on, while in the case that the short circuiting switch is off, the driving power is supplied to the motor during on of the on-off switch but is not supplied during off of the on-off switch. A control member is provided for operation by an operator for varying rotational speed of the motor. The control member is operative for turning on the short circuiting switch at the maximum amount of its operation. The switching circuit further includes an output element for producing an output signal corresponding to the amount of operation of the control member, a continuously conductive switch to be continuously kept on when the control member is operated between the maximum amount of operation and the amount slightly smaller than the maximum amount, and a control element connected to the output element and the continuously conductive switch for controlling the on-off switch.

4 Claims, 3 Drawing Sheets

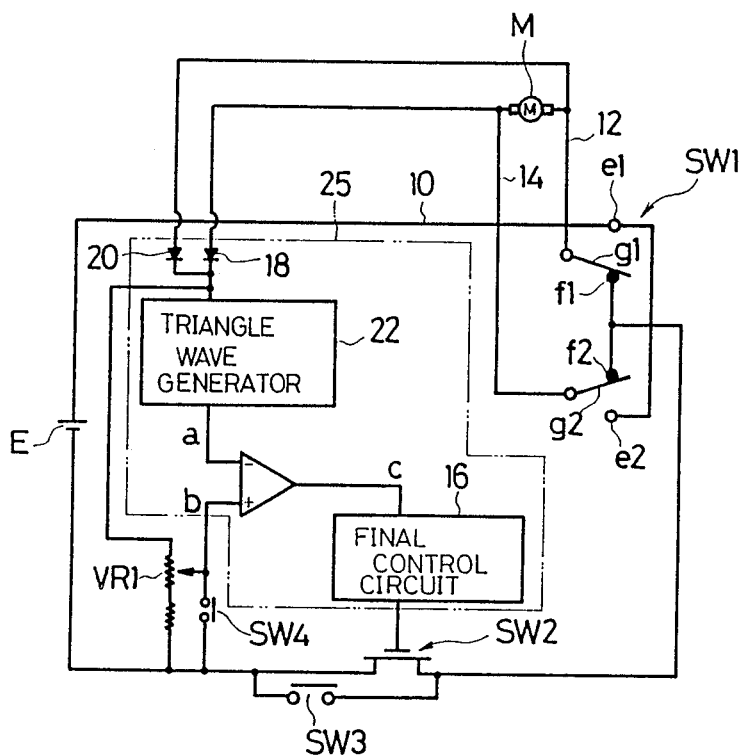
FIG.1
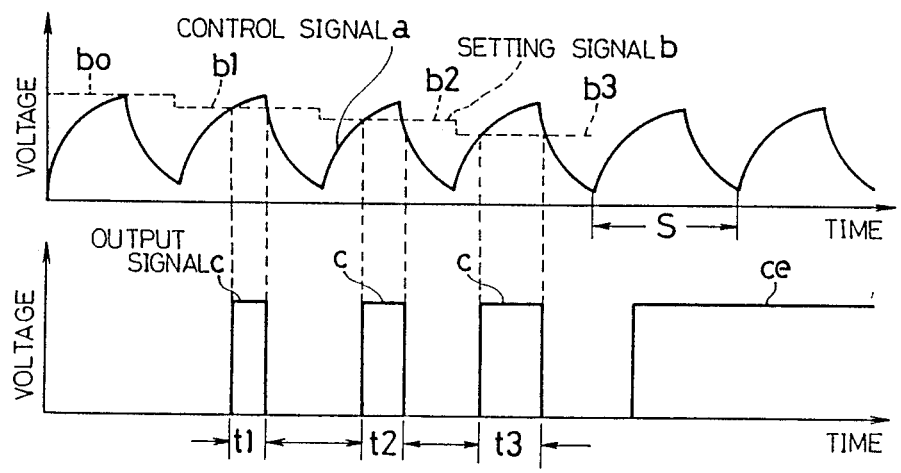
FIG.2 (a)
FIG.2 (b)

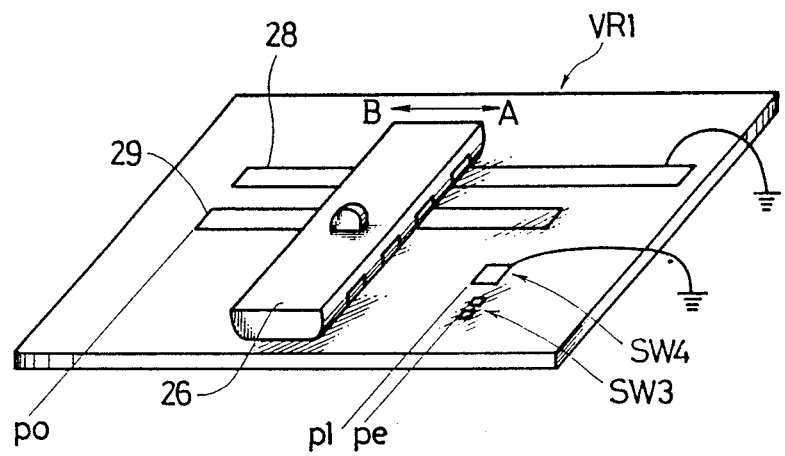
FIG. 3
FIG. 4 (a)
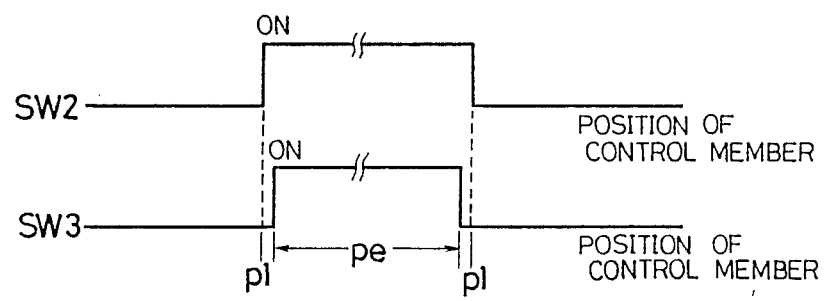
FIG. 4 (b)

SWITCHING CIRCUIT FOR VARYING ROTATIONAL SPEED OF MOTOR

BACKGROUND OF THE INVENTION

1. Field of the Invention

The present invention relates to a switching circuit for varying rotational speed of a motor, especially of a power driven tool such as a power driven screwdriver and a power driven drill.

2. Description of the Related Art

A switching circuit for controlling rotational speed of a motor is shown in FIG. 5. The switching circuit includes a power supply line 30 connecting a DC power source E with a DC motor M. In the power supply line 30, there is provided a change-over switch 32 for changing the direction of rotation of the DC motor M from the forward direction to the reverse direction or vice verse, a parallel connection of an on-off switch 34 with a short circuiting switch 36, a triangle wave generator 42 connected with the terminals of the DC motor M via diodes 38, 40 which are forwardly connected, a comparator 46 for comparing a control signal a derived from the triangle wave generator 42 with a rotational speed setting signal b derived from a variable resistor 44, and a final control circuit 48 for controlling the on-off switch 34 based on an output signal c of the comparator 46.

The variable resistor 44 changes its output or the voltage of the setting signal b according to the amount of operation of a control member (not shown) which may cooperate with a trigger of a power driven tool. The voltage of the setting signal b becomes lower as the amount of operation of the control member increases. The compartor 46 provides the output signal c when the voltage of the control signal a is higher than that of the setting signal b, and the final control circuit 48 turns on the on-off switch 34 based on the output signal c As the amount of operation of the control member increases, the time during which the on-off switch 34 is on becomes longer or the duty factor increases, so that the rotational speed of the DC motor M continuously increases.

Further, when the amount of operation of the control member becomes maximum, the short circuiting switch 36 turns on and the voltage of the power source E is directly applied to the DC motor M, so that the DC motor continuously rotates at the maximum speed.

The on-off switch 34 usually includes a power transistor which is to be used at the duty factor of less than 50%. When the short circuiting switch 36 is turned on, the output signal c corresponding to the duty factor of about 50% is continuously supplied to the final control circuit 48, and the on-off switch 34 turns on at the duty factor of about 50%. As explained above, the on-off switch 34 and the short circuiting switch 36 are connected in parallel in the power supply line 30. Therefore, when the on-off switch 34 is on, the current flows through both the on-off switch 34 and the short circuiting switch 36. On the other hand, when the on-off switch 34 is off, the current flows through only the short circuiting switch 36. For example, if the voltage of the DC power source E is 10 V, this voltage is not directly applied to the short circuiting switch 36 when the on-off switch 34 is on. However, this voltage of 10 V is directly applied to the short circuiting switch 36 when the on-off switch 34 is off, so that a spark is produced at the contact point of the short circuiting switch 36 because of the substantial potential difference by such direct application. Thus, when the short circuiting switch 36 turns on, the on-off switch 34 is intermittently turns on at the duty factor of about 50%. Therefore, as shown in FIG. 6, the short circuiting switch 36 may turn on either at a timing T1 where the control signal c exists and the on-off switch 36 is on or at a timing T2 where the control signal c does not exist and the on-off switch 34 is off. When the short circuiting switch 36 turns on at the timing T2, the voltage of the DC Power source E is directly applied to the short circuiting switch 36, so that the spark is produced at the short circuiting switch 36. Such production of sparks also occurs when the short circuiting switch 36 turns off from on, and as sparks are repeatedly produced, the contact is worn and the life of the short circuiting switch 36 is shortened.

In order to overcome such drawbacks, it may be considered to use as the on-off switch 34 a power transistor which permits large duty factor such as 100%, so that the on-off switch 36 can always be on when the short circuiting switch 36 is turned on. However, such a power transistor to permit large duty factor is expensive and therefore, the costs of manufacturing the switching circuit increases, thereby producing another drawback.

SUMMARY OF THE INVENTION

It is, accordingly, an object of the present invention to provide a switching circuit for varying rotational speed of a motor which prevents the contact of a short circuiting switch from wearing caused by sparks and ensures long life of the switch.

It is another object of the present invention to provide a switching circuit which can prevent the contact of a short circuiting switch from wearing by using as the on-off switch a power transistor which permits relatively small duty factor and which is of small heat capacity and of low cost.

According to the present invention, there is provided a switching circuit for varying rotational speed of a motor, comprising:

a power supply line for connecting the motor to a power source so as to supply driving power to the motor;

a parallel connecting circuit of an on-off switch and a short circuiting switch provided in said power supply line, in such a manner that the driving power is continuously supplied to the motor when the short circuiting switch is on, while in the case that the short circuiting switch is off, the driving power is supplied to the motor during on of the on-off switch but is not supplied during off of the on-off switch;

a control member for operation by an operator for varying rotational speed of the motor, the control member being operative for turning on the short circuiting switch at the maximum amount of operation;

output means for producing an output signal corresponding to the amount of operation of the control member;

a continuously conductive switch to be continuously kept on when the control member is operated between the maximum amount of operation and the amount slightly smaller than the maximum amount; and control means connected to the output means and the continuously conductive switch for controlling the on-off switch, the control means being operative to continuously keep the on-off switch on during the time when the continuously conductive switch is on, and being operative to increase the ratio of the time during which the on-off switch is on to a unit period of cycle based on the output signal from the output means as the amount of operation of the control member increases;

whereby as the amount of operation of the control member increases from the minimum amount to the maximum amount, the ratio of the time to supply power to the motor to the unit period of cycle increases, and thereafter, the power is continuously supplied to the motor when the amount of operation reaches the amount exceeding slightly smaller than the maximum amount of operation by turning of the continuously conductive switch to on and by subsequent turning of the short circuiting switch to on at the maximum amount of operation.

Preferably, the control means includes a triangle wave generator, a comparator for comparing the output of the output means with the output of the triangle wave generator, and final control means connected to the comparator for keeping the on-off switch on as long as the output of the triangle wave generator exceeds the output of the output means.

The continuously conductive switch is connected in parallel with the output means, and the grounded signal becomes input to the comparator instead of the outPut of the output means when the continuously conductive switch is on, so that the comparator judges the output of the triangle wave generator as exceeding the output of the output means so as to keep the on-off switch on.

The ratio of the time during which the on-off switch is on to the unit period of cycle controlled by the control means is about 0.5, and the on-off switch permits switching at the ratio of the time during turn-on to the time during turn-off less than about 0.5.

The invention will become more fully apparent from the claims and the description as it proceeds in connection with the drawings.

BRIEF DESCRIPTION OF THE DRAWINGS

FIG. 1 is a switching circuit for varying rotational speed of a motor according to the present invention;

FIG. 2 is a graph showing time-voltage characteristic of a triangle wave control signal and a setting signal as input to a comparator of the switching circuit and of an output signal from the comparator as shown in FIG. 1;

FIG. 3 is a schematic perspective view of a variable resistor shown in FIG. 1 also showing a control member and its related switches;

FIG. 4 is a timing chart of continuous on action of an on-off switch and on action of a short circuiting switch shown in FIG. 1;

DETAILED DESCRIPTION OF THE PREFERRED EMBODIMENT

Figure 5:
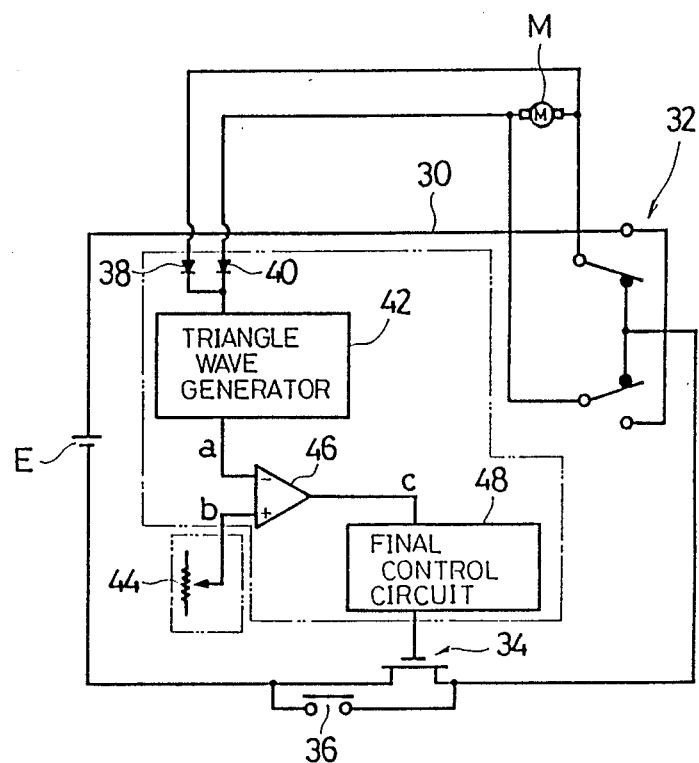
FIG. 5 is a switching circuit for varying rotational speed of a motor according to the related art.
Figure 6:
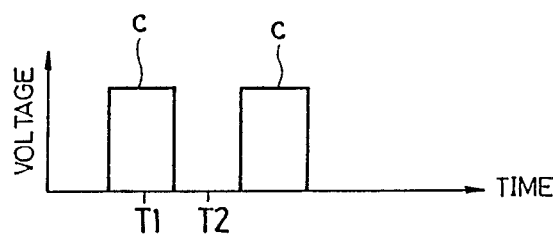
FIG. 6 is a graph showing time-voltage characteristic of an output signal from a comparator and its related timing of turn-on of a short circuiting switch of the switching circuit shown in FIG. 5.

Referring to FIG. 1, there Is shown a switching circuit for controlling rotational speed of a DC motor M of a power driven tool (not shown). The DC motor M is connected in series with a DC power source E in a power supply line 10 via a change-over switch SW1.

The change-over switch SW1 includes contacts e1, e2 connected to a plus terminal of the DC power source E, contacts f1, f2 connected to a minus terminal of the DC power source E and switch elements g1, g2 each connected to corresponding terminals of the DC motor M through lines 12, 14. The switch element g1 may be switched to contact either of the contact e1 or the contact f1, while the switch element g2 may be switched to contact either of the contact e2 or f2. By the selection of switching of the switch elements g1 and g2, the direction of rotation of the DC motor M can be changed to the reverse direction from the forward direction or vice verse, or the supply of the power to the DC motor M can be stopped:

Forward Rotation
Switch element g1—contact e1
Switch element g2—contact f2
Reverse Rotation
Switch element g1—contact f1
Switch element g2—contact e2
Stop
Switch element g1—contact f1
Switch element g2—contact f2

In the power supply line 10, there is also provided a parallel connection of an on-off switch SW2 comprising a power transistor and of a short circuiting switch SW3. The switching of the on-off switch SW2 is controlled by a final control circuit 16. Input to the final control circuit 16 is an output signal c of a comparator 24 which compares a control signal a derived from a triangle wave generator 22 with a setting signal b derived from a variable resistor VR1 (see FIG. 2). The triangle wave generator 22 includes a resistance, a capacitor and an amplifier (not shown) and is connected to the respective terminals of the DC motor M via diodes 18, 20. The diodes 18, 20, the triangle wave generator 22, the comparator 24 and the final control circuit 16 form a low speed circuit 25 as shown in FIG. 1.

As shown in FIG. 2(a), the control signal a is composed of a series of triangle waves on frequency and amplitude, while, the setting signal b changes its voltage level according to the position of a control member 26 of the variable resistor VR1 shown in FIG. 3. The control member 26 is constructed as a brush which contacts a resistance member 28 and an output terminal 29, so that the voltage level of the setting signal b changes according to the contact position of the control member 26 with the resistance member 28. The control member 26 can be operated by an operator. In the switching circuit used for the power driven tool as with this embodiment, the control member 26 is operatively connected to a trigger (not shown) of the power driven tool and is operated by the operator through the trigger. Further, the resistance member 28 is connected to the minus terminal of the DC power source through the power supply line 10 at the end of direction of arrow A, while it is connected between the diodes 18, 20 and the triangle wave generator 22 at the end of direction of arrow B or opposite direction. The output terminal 29 is connected to the comparator 24 so as to output the setting signal b.

In this embodiment, the voltage level of the setting signal b continuously decreases as the control member 26 moves in the direction of arrow A, while it continuously increases as the control member 26 moves in the direction of arrow B.

The comparator 24 compares the control signal a with the setting signal b and produces the output signal c when the voltage level of the control signal a exceeds the setting signal b. As shown in FIG. 2(a), the period of time t of the output signal c becomes longer as t1, t2, t3 ... as the voltage level of the setting signal b is lowered as b1, b2, b3 .... The setting signal bo corresponds to the end of stroke in the direction of arrow 8 or the minimum operation position Po of the control member 26. The setting signal bo at such position Po always exceeds the control signal a, so that there is no output signal c.

The output signal c as explained is then supplied to the final control circuit 16 for the on-off switch SW2, and the final control circuit 16 turns on the on-off switch SW2 during only the period of time t of the output signal c so as to supply electric power to the DC motor M. Such time t continuously changes as t1, t2, t3 ... to become longer according to the movement of the control member 26 in the direction of arrow A and consequently, the rotational speed of the DC motor M continuously changes from low to high. Although the time t becomes longest at the end position Pe of the control member 26 in the direction of arrow A, a continuously conductive switch SW4 is positioned at Pl which is immediately before the position Pe.

As shown in FIG. 1, the continuously conductive switch SW4 is connected between the minus terminal of DC power source E and the comparator 24 in parallel to the resistance 28 of the variable resistor VR1. With this arrangement, when the continuously conductive switch is on, a continuous output signal ce is produced by the comparator 24 and is supplied to the final control circuit 16 so as to continuously keep the on-off switch on, so that the DC motor M continuously rotates at high speed.

In this embodiment, the on-off switch SW2 is a transistor which switches at the duty factor not more than about 50% preferably at 40 to 50%, and the ratio of the period of time t of the output signal c or the time when the power is supplied to the DC motor M to the unit of period S of the control signal a is determined at 40 to 50% even if the control member 26 is positioned at its maximum operative position Pe.

Further, as shown in FIG. 3, the short circuiting switch SW3 is positioned at the maximum operative position Pe of the control member 26. Therefore, when the control member 26 reaches the position Pe, the short circuiting switch SW3 turns on in addition to the on-off switch SW2, so that the DC motor M rotates at high sPeed with both the on-off switch SW2 and the short circuiting switch SW3 being continuously kept on.

Conversely, when the control member 26 moves from the maximum operative position Pe toward the minimum operative position Po, the short circuiting switch SW3 firstly turns off and thereafter the on-off switch turns off. The timing chart of such turn-on of the on-off switch SW2 by the action of continuously conductive switch SW4 and the corresponding timing chart of turn-on of the short circuiting switch SW3 are shown in FIGS. 4(a) and 4(b), respectively.

In operation, the control member 26 is normally kept in the minimum operative position Po, and therefore, the on-off switch SW2 and the short circuiting switch SW3 are kept off. Firstly, the operator turns the changeover switch SW1 to select the direction of rotation of the DC motor M, and thereafter moves the control member 26 through the trigger toward the maximum operative position pe. By such movement of the control member 26 between the position Po to P1, the voltage level of the setting signal b changes according to the position, and the corresponding output signal c is supplied to the on-off switch SW2 to switch the same on during the time t within the unit of period S. Thus, the DC motor M rotates at a speed corresponding to the time t and increases its speed as the control member 26 moves toward the position Pe.

As the control member 26 approaches the position Pe, the on-off switch SW2 turns to continuously keep on at the position P1, and thereafter the short circuiting switch Sw3 turns on. For example, if the voltage of the DC power source E is 10 V and the dropped voltage between the emitter and collector of the power transistor or the on-off switch SW2 is 2 to 3 V, the switching voltage applied to the short circuiting switch SW3 is 2 to 3 V which corresponds to the dropped voltage. Therefore, the full voltage of 10 V of the DC power source E is not applied to the short circuiting switch SW3 and no spark is produced at the contacts of the short circuiting switch SW3. This is the same when the short circuiting switch SW3 turns off.

Consequently, the short circuiting switch SW3 is prevented from being used at the voltage which produces sparks, and the short circuiting switch SW3 may have a long life.

Further, in this embodiment, the power transistor for the duty factor of no more than about 50%, preferably about 40 to 50% as the on-off switch SW2, As described above, the full voltage of DC power source E is applied to the on-off switch SW2 only before the short circuiting switch SW3 turns on and during very short time, and there is no problem even if the current exceeding the rated current flows through the on-off switch SW2 during such very short time. For this reason, it is not necessary to use an expensive power transistor which can be continuously used for the duty factor of 100% as the on-off switch SW2.

Thus, in this embodiment the relatively cheep power transistor which permits relatively small duty factor and has relatively small heat capacity can be used as the on-off switch SW2 so that the switching circuit can be constructed at low cost.

While the invention has been described with reference to a preferred embodiment thereof, it is to be understood that modifications or variations may be easily made without departing from the scope of the present invention which is defined by the appended claims.

What is claimed is:

1. A switching circuit for varying rotational speed of a motor, comprising:
   a power supply line for connecting the motor to a power source so as to supply driving power to the motor;
   a parallel connecting circuit of an on-off switch and a short circuiting switch provided in said power supply line, in such a manner that the driving power is continuously supplied to the motor when said short circuiting switch is on, while in the case that said short circuiting switch is off, the driving power is supplied to the motor during on of said on-off switch but is not supplied during off of said on-off switch;
   a control member for operation by an operator for varying rotational speed of the motor, said control member being operative for turning on said short circuiting switch at the maximum amount of operation;

output means for producing an output signal corresponding to the amount of operation of said control member;

a continuously conductive switch to be continuously kept on when said control member is operated between the maximum amount of operation and the amount slightly smaller than the maximum amount; and control means connected to said output means and said continuously conductive switch for controlling said on-off switch, said control means being operative to continuously keep said on-off switch on during the time when said continuously conductive switch is on, and being operative to increase the ratio of the time during which said on-off switch is on to a unit period of cycle based on said output signal from said output means as the amount of operation of said control member increases;

whereby as the amount of operation of said control member increases from the minimum amount to the maximum amount, the ratio of the time to supply power to the motor to the unit period of cycle increases, and thereafter, the power is continuously supplied to the motor when the amount of operation reaches the amount exceeding slightly smaller than the maximum amount of operation by turning of said continuously conductive switch to on and by subsequent turning of said short circuiting switch to on at the maximum amount of operation.

2. The switching circuit as defined in claim 1 wherein said control means includes a triangle wave generator, a comparator for comparing the output of said output means with the output of said triangle wave generator, and final control means connected to said comparator for keeping said on-off switch on as long as the output of said triangle wave generator exceeds the output of said output means.

3. The switching circuit as defined in claim 2 wherein said continuously conductive switch is connected in parallel with said output menas, and wherein the grounded signal becomes input to said comparator instead of the output of said output means when said continuously conductive switch is on, so that said comparator judges the output of said triangle wave generator as exceeding the output of said output means so as to keep said on-off switch on.

4. The switching circuit as defined in claim 1 wherein the ratio of the time during which said on-off switch is on to the unit period of cycle controlled by said control means is about 0.5 when the amount of operation of said control member reaches the amount slightly smaller than the amount for turning said continuously conductive switch to on, and wherein said on-off switch permits switching at the ratio of the time during turn-on to the unit period less than about 0.5.

* * * * *